United States Patent [19]

Wendt

[11] 4,092,718

[45] May 30, 1978

[54] COMPUTERIZED DISPATCHING SYSTEM

[76] Inventor: Hans J. Wendt, Bechsteinstrasse 4, 215 Buxtehude, Germany

[21] Appl. No.: 597,154

[22] Filed: Jul. 18, 1975

Related U.S. Application Data

[63] Continuation of Ser. No. 453,545, Mar. 21, 1974, abandoned, which is a continuation-in-part of Ser. No. 307,554, Nov. 17, 1972, abandoned.

[51] Int. Cl.² .......................... B61L 27/00; G06F 15/56

[52] U.S. Cl. .......................... 364/436; 340/31 R

[58] Field of Search .................. 235/150.24; 246/2 R, 246/3; 343/112 TC; 340/23, 31 R, 31 A, 172.5

[56] References Cited

U.S. PATENT DOCUMENTS

| | | | |
|---|---|---|---|
| 3,197,738 | 7/1965 | Raser et al. | 340/172.5 |
| 3,219,814 | 11/1965 | Livingston | 246/3 |
| 3,268,727 | 8/1966 | Shepard | 246/187 |
| 3,553,449 | 1/1971 | Hathway | 246/3 |
| 3,575,594 | 4/1971 | Elcan | 246/2 R |
| 3,711,686 | 1/1973 | Apitz | 235/150.24 |

*Primary Examiner*—Edward J. Wise

*Attorney, Agent, or Firm*—Karl F. Ross

[57] ABSTRACT

A passenger buys his ticket at a station from a device which registers his destination and transmits the information to a central computer using the destination data to plot a travel path for a fleet of buses or other mass-transit vehicles. The arrival time of the next vehicle is indicated at each station; as the user boards such vehicle his destination is entered in a register therein. The central computer reads the vehicular memories by radio communication to modify, if necessary, the instructions given to the driver. Traffic density, average vehicular speed and the rhythm of traffic lights are also read into the central computer by way of supplemental information.

10 Claims, 7 Drawing Figures

31
25
A
B
30
H
3

C
4
8
Input/ Output
Xmtr
Rcvr.
9
5
Compu- ter
Coder/ Decoder
7
1
Traffic Display
Coder/ Decoder
2
6
26
Control- ler
28
CENTRAL OFFICE
G
F
D
E

COMPUTERIZED DISPATCHING SYSTEM

CROSS-REFERENCE TO RELATED APPLICATION

This is a continuation of application Ser. No. 453,545, filed Mar. 21, 1974, now abandoned, as a continuation-in-part of application Ser. No. 307,554 filed Nov. 17, 1972 and now abandoned.

FIELD OF THE INVENTION

My present invention relates to a dispatching system for a fleet of preferably trackless vehicles such as buses, limousines or taxicabs.

BACKGROUND OF THE INVENTION

Mass transit is becoming ever more difficult to organize efficiently in modern urbanized society. The use of private cars in city traffic has proven to be an impractical solution to the problem of moving vast numbers of persons to and from their jobs and about their business within the urban area. On the other hand, the transportation of large numbers of people in a limited area by public conveyances constitutes a problem which has to date never been solved satisfactorily since traffic patterns have been found to be unpredictable beyond any sort of coarse planning for heavy circulation during rush hours and light circulation during weekends and at night. Attempted solutions have all required the building of entirely new and extremely expensive overhead or underground systems out of the financial reach of many municipalities.

OBJECTS OF THE INVENTION

It is, therefore, an object of my present invention to provide an automated dispatching system of sufficient flexibility to adapt itself to widely varying traffic conditions.

Another object is the provision of such a system which can be applied to any existing fleet of preferably trackless vehicles.

SUMMARY OF THE INVENTION

These objects are attained, according to my present invention, by means of a dispatching system wherein a central computer is linked by telecommunication to each vehicle of a fleet and to a multiplicity of stations served thereby. The stations have ticket dispensers or other passenger-operated devices which supply the central computer with data on the number of persons waiting at each stop and on their destinations. This information is then compared with routing and loading information received from each vehicle and a tentative course is plotted for each vehicle which will take it in the most efficient manner through a complete run. The would-be riders at each station are informed of the arrival time of the next vehicle. When they board the vehicle, their target stations are reported to the computer by further passenger-operated means such as, for example, a ticket reader also serving as a cancellation device. This gives the computer a count on the load of each vehicle as well as a compilation of the destinations of its occupants, enabling it to modify the tentative course by skipping any stop not desired by an actual occupant of the vehicle if the persons waiting at such stop can be conveniently served by other vehicles traveling the same general route.

Advantageously, each station has a panoramic destination selector whereby the rider need merely actuate a corresponding switch or a pair of co-ordinated switches in order to receive his ticket upon payment of the requisite fare, if any, or the insertion of a token or a valid pass. An indicator at the station shows the prospective arrival time of the next vehicle bound for one or more stations along different routes.

The office of the automated dispatcher comprising the central computer may, according to another feature of my invention, also be provided with a display indicating the various routes with their stations and the instantaneous locations of all vehicles operating at the time. Advantageously, this central office includes a controller for the city's traffic lights responsive to signals from traffic sensors at the stations, these signals as well as the settings of the traffic lights being communicated to the computer which can therefore be programmed to let the vehicles bypass any traffic jams in their normal path.

In accordance with a further feature of the present invention, the central computer periodically samples the register aboard each vehicle into which the destination of every entering passenger is read. Associated with this register may be a display indicator controlled by the central computer in order to identify the next stop, or several stops, along with any incidental routing directions necessary (e.g. to detour a construction site). A cancellation button is actuated by the driver each time he arrives at the closest station shown on his indicator to enter this information in his register so that the next time this register is read by the central computer the various arrival times can be updated. A speed sensor on each vehicle may be in constant or intermittent communication with the central computer so as to aid in the calculation of arrival times.

According to another feature of the invention, the vehicles may be equipped with code transmitters and receivers to enable a passenger to check with the central computer about availability of transfer to other lines. This is achieved by feeding to the central computer a pair of multidigit code groups, one corresponding to the intended transfer point and the other representing the ultimate destination. The coded response from the central computer can be decoded and translated, for example, into an audible signal, or a central operator may reply by voice. The frequency of such inquiries may be evaluated by the computer to initiate possible route changes.

BRIEF DESCRIPTION OF THE DRAWING

The above and other objects, features and advantages of my invention will now be described in detail with reference to the accompanying drawing in which.

SPECIFIC DESCRIPTION

Figure 1:
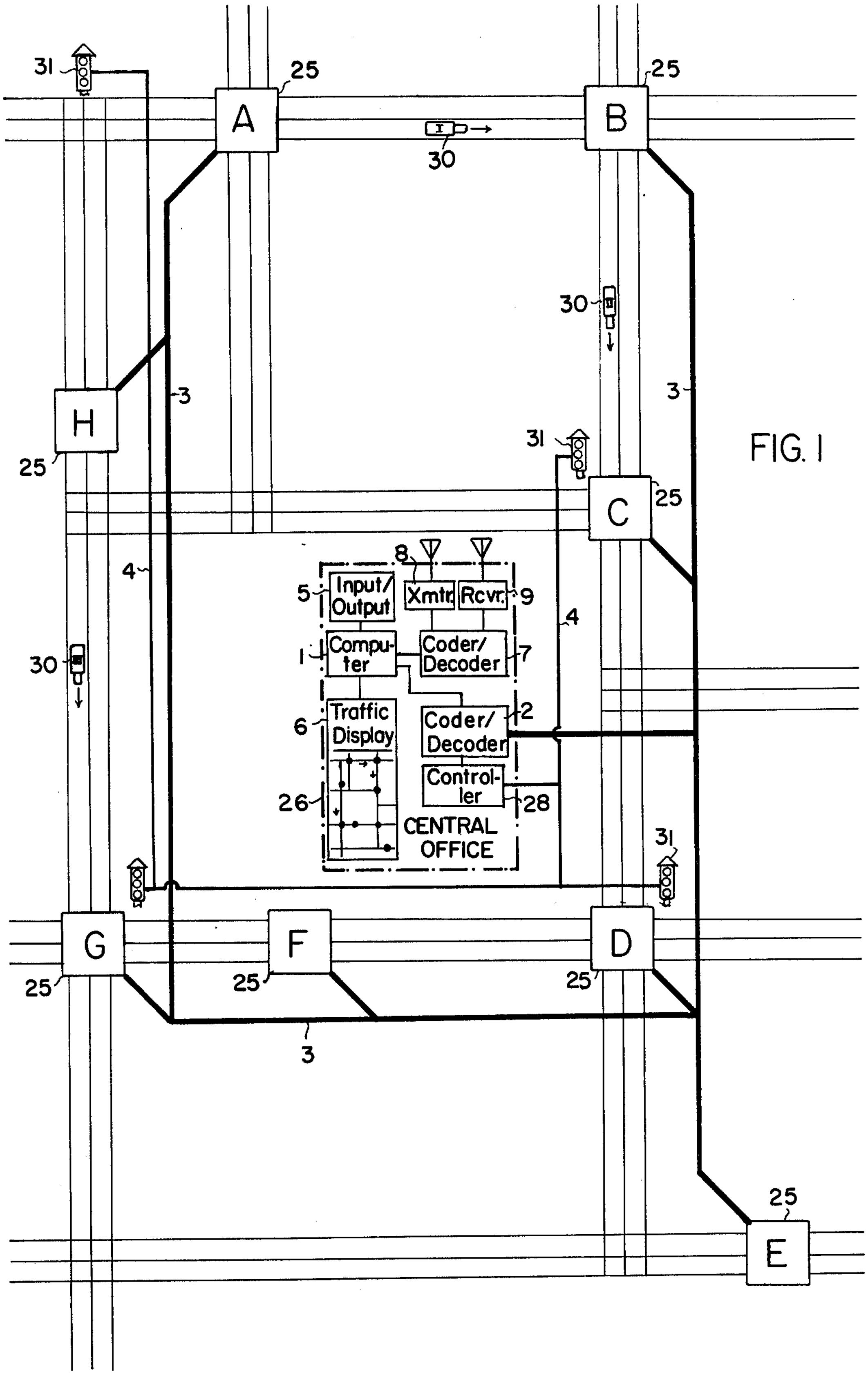
FIG. 1 is a schematic view of a central office and vehicular stations in a computerized dispatching system embodying my invention.

As shown in FIG. 1, a transit system according to the invention includes a multiplicity of stations 25, individually designated A through H, all connected via communication channels 3 (radio links or transmission lines) to a central office 26. Several vehicles 30 are shown in an area monitored by the computer and are individually designated I, II, III. Traffic lights 31 in the area served by the system are connected to a controller 28 at the central office by lines 4. All stations 25 may be laid out so that they are only 200 to 400 meters away from any given point in the community.

The central station 26 has at its heart a computer 1 connected through a coder/decoder 2 to the communication channels 3 and to the traffic-light controller 28. This computer 1 is also connected through a further coder/decoder 7 to a transmitter 8 and a receiver 9 for radio communication with the vehicles 30 as will be described below. An input/output device 5 is connected to this computer 1 for programming it and reading out information while a traffic display 6 also controlled by the computer allows an operator at office 26 to see at a glance just how the transit system is functioning.

Figure 2:
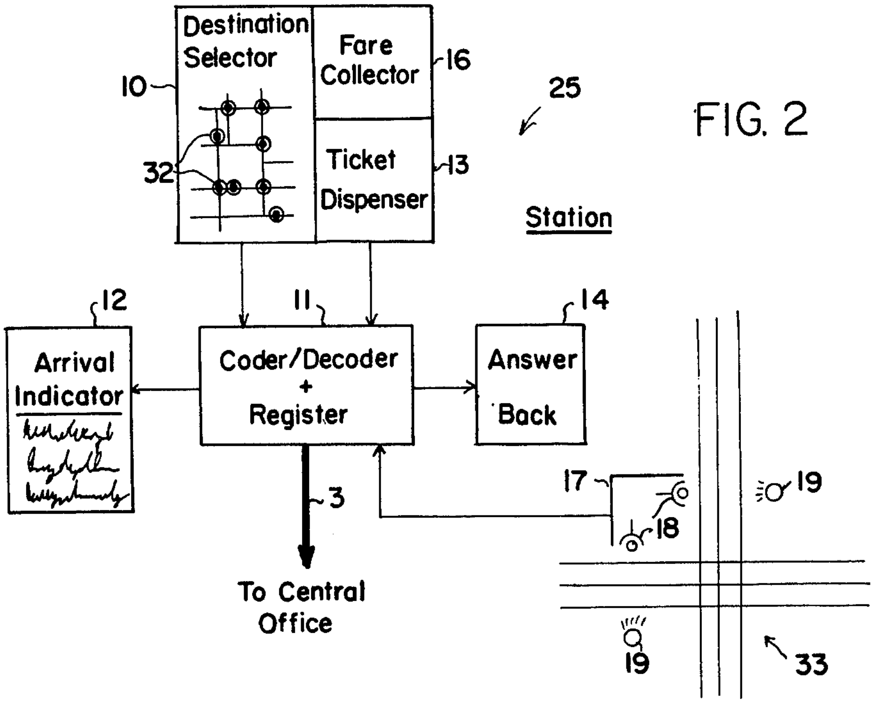
FIGS. 2 and 3 are block diagrams of the equipment at a station and aboard a vehicle, respectively, in the system of FIG. 1.

As shown in FIG. 2, each station 25 has a destination selector 10 exhibiting a map of the system and bearing pushbutton switches 32 at points on the map corresponding to the other stations. This selector 10 works in a coder/decoder and register 11 which is connected via the associated communication channel 3 to the central office 26. A fare collector 16 and a ticket dispenser 13 are controlled by selector 10, the dispenser issuing a ticket only upon insertion of one or more coins or tokens (in an amount displayed by the collector on instruction from the selector) or presentation of a pass to a scanner not shown. An answer-back unit 14 (e.g. an illuminated sign) reports the arrival, from the central office, of a signal confirming the processing of the destination selection by the computer 1; if this signal is not forthcoming, the prospective rider may press a button on selector 10 to cancel the booking made and to recover his fare, such cancellation being prevented by the reception of the answer-back signal in register 11. A signal from the computer, also stored in that register, operates an indicator 12 to display the expected time of arrival of the next vehicle headed for the selected destination or, possibly, for an intermediate transfer point.

A street intersection 33 adjacent the station 25 is kept under surveillance by a traffic monitor 17 comprising lamps 19 and electric eyes 18 that count the passing vehicles. Their count is averaged by a conventional integrator and fed through the coder/decoder and register 11 to the central office 26. Alternatively, I may use a traffic-density detector 17 as disclosed in U.S. Pat. No. 3,536,900 which translates its raw data into a measure of delay and sends this calculation to the central computer 1.

Figure 3:
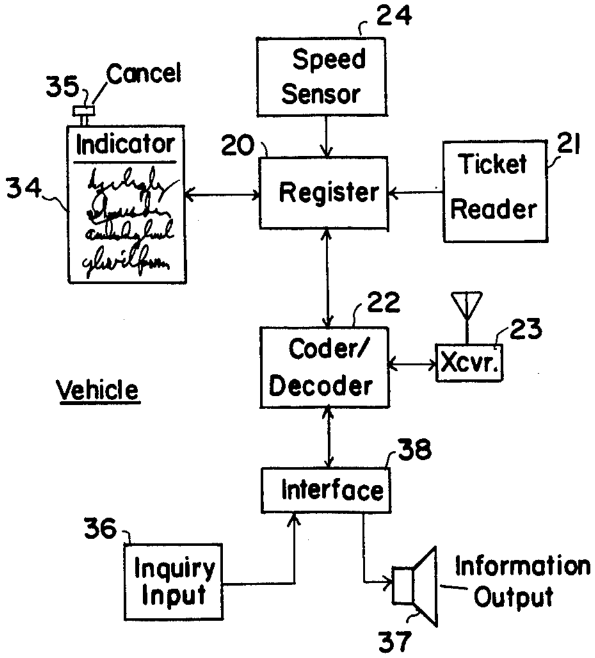

In each vehicle a further register 20 is provided as shown in FIG. 3. This register 20 is connected through a coder/decoder 22 to a transceiver 23 communicating through the associated two-way radio link with the central transmitter 8 and receiver 9. A ticket reader 21 feeds destination information into the register 20 so that the central computer 1, upon periodically sampling this register, may know how many passengers have boarded and whither they are bound. Register 20, on information from the central office, also sets a visual indicator 34 viewable by the operator of the vehicle 30 to show him the next-following stop or stops. This indicator is provided with a cancellation button 35 which the operator depresses each time he arrives at a station to delete the corresponding stop indication and to transmit to the central office 26 a signal from which the computer can determine the vehicle's subsequent course. A speed sensor 24 working into the register 20 may also furnish the central computer 1 with further information enabling it to calculate, on the basis of the vehicle's position and the traffic-light timing as well as the traffic density, the expected arrival time at its next stop or stops for transmission of this information to the station or stations concerned.

The coder/decoder 22 is also connected via an interface unit 38 to an inquiry input 36 (e.g. a keyboard or a dial) and a speaker 37 serving as information output. Inquiries about transfer connections, which may be initiated by dialing a number identifying the central office, are fed into the transceiver 23; the answers, delivered by the computer with or without the intervention of a human operator at the central office, are announced through the speaker 37.

Figure 4:
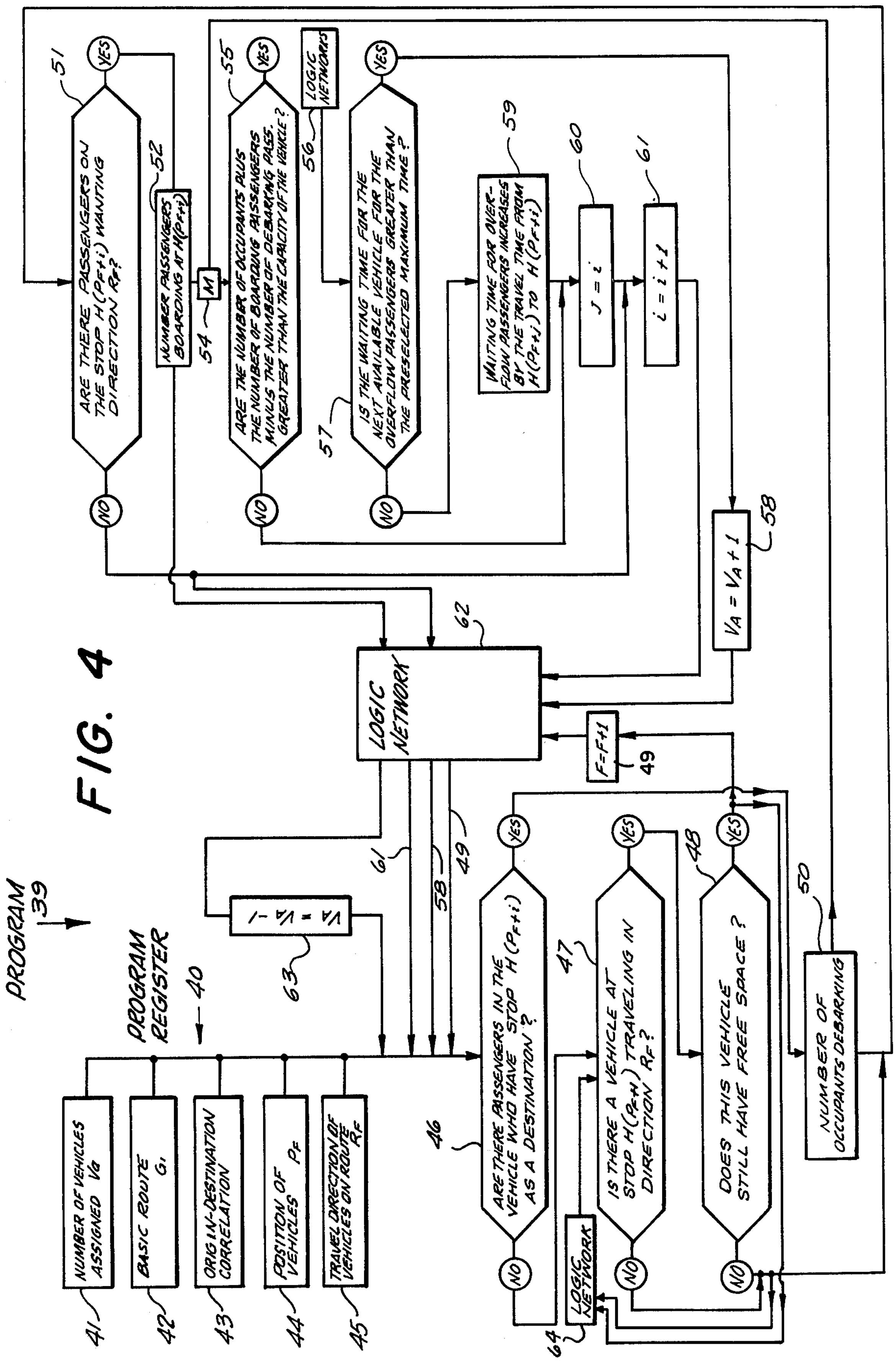
FIG. 4 is a flow chart for the program of a central computer in the system of FIG. 1.

I shall now describe, with reference to FIGS. 4–7, details of a program 39 for performing the more significant operations of my dispatching system by means of computer 1. Program 39, diagrammed in FIG. 4, makes use of an input register 40 containing information bits in data stages 41–45; decision stages 46, 47, 48, 51, 55 and 57; buffer stages 50, 52 and 59; a memory 54; logic steps 49, 58, 60, 61 and 63; and logic networks 56, 62 and 64. The data stored in register 40 may be updated by new information obtained on any run-through; the answers to the questions posed by the decision stages, either "yes" or "no", determine the subsequent course of that particular run-through by proceeding to different steps depending on the answer received on the basis of current data. The buffer stages call forth the required information from the vehicle and station inputs when addressed; the logic steps are conclusions which necessarily follow from the preceding sequence. The logic networks determine aspects of the program not answered by simply calling up information stored in binary form. Except for these logic networks, more fully described with reference to FIGS. 5–7, all the components of FIG. 4 are conventional components of a general-purpose computer.

The program 39 is activated each time a driver of one of the vehicles 30 has reached a stop and presses a cancellation button 35. The relevant information, delivered in coded form to the input register 40, includes the number $V_A$ of vehicles currently in service (41), the basic route plan of the day (42), points of departure and destinations of passengers aboard (43), its instant position $P_F$(44), and its direction $R_F$(45). The first program step 46 determines whether any passengers aboard the vehicle have the next stop $H(P_{F+i})$ as a destination. If the answer to question 46 is "yes", the program advances to buffer stage 50 where the number of persons debarking at the next stop is determined from input data 43 and sent to memory 54 for storage until needed. If the answer to program step 46 is "no", step 47 determines if another vehicle is already serving stop $H(P_{F+i})$, if so, step 48 determines whether that vehicle has free space. If this is also answered affirmatively, position $P_f$ is advanced to $P_{f+i}$ in step 49 and the program returns through logic network 62, which will be discussed subsequently, to input register 40 where it may be reactivated for the new position $P_F$ whenever the driver presses cancellation button 35 again. The stop from which button 35 is pressed to activate program 39 is referred to as $H(P_{F+j})$.

If the answer to either step 47 or 48 is "no", the program advances to step 51 as it does after step 50. Step 51 determines from input data 43 whether any prospective passengers at the upcoming stop want to travel in the direction of the present vehicle; if so, step 52 specifies how many passengers wish to board and sends the information to logic network 62 as well as to memory 54. The information stored in that memory enables a determination in step 55 if the sum of the numbers of would-be riders and passengers remaining aboard is greater than the capacity of the vehicle. If the answer to step 55 is "yes", logic network 56 is activated and, utilizing the data collected from traffic-density monitors 17 (which may be of the type disclosed in U.S. Pat. No. 3,536,900) in conjunction with the data bits in stages 44 and 45 (which store the updated vehicle locations and directions, respectively), determines the waiting time for the overflow passengers until the next available vehicle arrives. This waiting time is compared with a preselected maximum waiting time in step 57. If a "yes" answer appears in step 57, i.e. if the present waiting time exceeds the preselected maximum, the signal is transmitted to step 58 where the command $V_A = V_{A+1}$ is given, adding another vehicle to the route at the overflowing stop $H(P_{F+i})$ as this information is transmitted back to the input register 40 through logic network 62. If the answer to program step 51 is negative, i.e. if there are no passengers waiting at stop $H(P_{F+i})$ for direction $R_F$ the program advances directly to step 61, where $i$ becomes $i+1$, and the cycle is ready to be restarted with the new $i$ value in register 40 (after the information passes through logic network 62). If step 51 is answered affirmatively but the number of persons waiting for the vehicle does not cause an overflow, the answer to step 55 is negative; this sends the program to step 60 where $j = i$, the upcoming stop becoming the present stop, subsequently augmenting the designation of the value of $i$ by $+1$ and completing the program in the manner discussed. If a passenger overflow is brought about by those wishing to board ("yes" at step 55) but the projected waiting time calculated in logic network 56 is not great enough to warrant adding a vehicle to the route (the answer at step 57 being "no"), the projecting waiting-time increase is recorded in step 59 and the program advances through step 60 in a manner similar to that described above.

Figure 5:
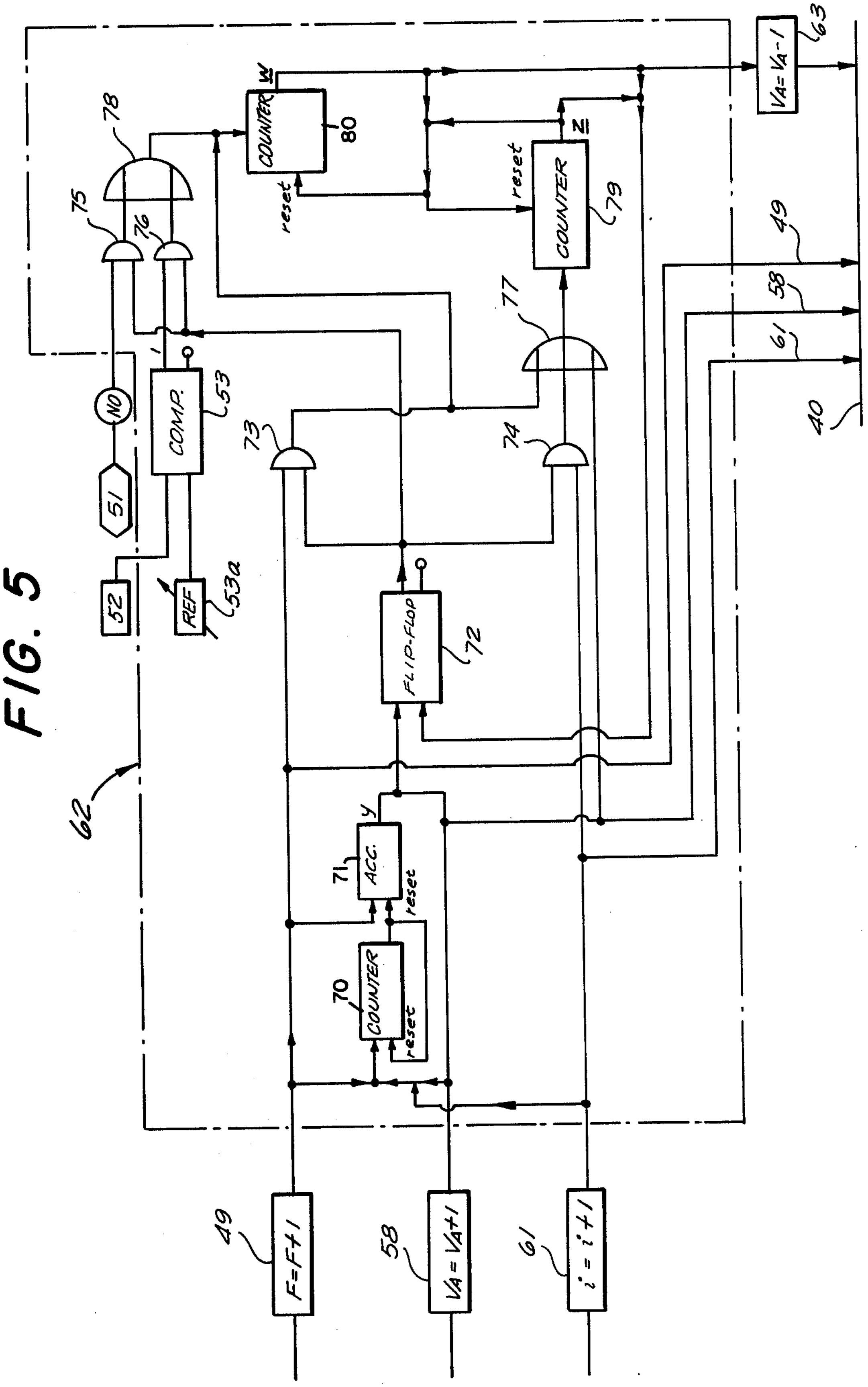
FIG. 5 is a diagrammatic representation of a logic network forming part of the computer.

Logic network 62, as diagrammed in FIG. 5, is included in the program 39 in order to remove vehicles from service when the number and location of passengers no longer warrants the use of all vehicles in service at the time. Signals from program steps 49 ($F=F+1$), 58 ($V_A=V_{A+1}$) and 61 ($i = i+1$) are first fed to a counter 70 which clears itself and restarts after a count of $x$ pulses from the three aforementioned stages. Counter 70 contains an accumulator 71 which stores pulses from step 49 and emits a signal setting a flip-flop 72 after accumulating a smaller number $y$ of pulses, but the accumulation is restarted each time counter 70 is cleared. The signals from steps 49, 58 and 61 also bypass counter 70 and continue on to input register 40 where they inscribe their respective information changes and ready the program 39 for a new cycle. The signal from step 58, which adds a vehicle to the transit zone, sets flip-flop 72 in addition to returning to input register 40, as does the collection of $y$ pulses from step 49 in accumulator 71. Flip-flop 72, when set, energizes one input of each of four AND gates 73, 74, 75, 76. The other inputs of AND gates 73 and 74 receive signals from steps 49 and 61, respectively, these gates working into an OR gate 77 also receiving pulses from step 58 which bypass the flip-flop 72 as well as serve to set it. Signals energizing the other inputs of AND gates 75 and 76 are derived from the decision stages of the program. A "no" answer from step 51 (no passengers wanting the approaching vehicle) energizes the second input of AND gate 75 while a "yes" answer causes the waiting passengers to be counted in step 52, the count being fed into a comparator 53 which produces an output (1) if the number waiting is less than a predetermined percentage $p$ of the vehicle's capacity, as selected in a reference register 53a (FIG. 4), and no output (0) if the number waiting is greater than this percentage. An output (1) energizes the second input of AND gate 76. AND gates 75 and 76 work into an OR gate 78. OR gate 77 receives a signal pulse each time a program run is completed when flip-flop 72 is set, and transmits these pulses to a counter 79 which counts up to $z$ pulses, at which point it emits a signal resetting the flip-flop 72 and clearing the counter 79. Another counter 80 is fed by signals from OR gate 78 and AND gate 73, and emits a signal pulse when the count reaches $w$ pulses which, in addition to resetting the flip-flop 72 and clearing the counter 80, activates step 63 in the program to perform the operation $V_A=V_{A-1}$ which takes a vehicle out of service.

This circuit receives the results of every program run in its first counter 70 and reviews the need for the number of vehicles in use when the flip-flop 72 is set, which occurs either when a vehicle is added (at step 58) or when a significant percentage (greater than $y/x$, since $y$ is reached before $x$) of vehicles may bypass a stop served by another vehicle (step 49). In such a case, the second counter 79 receives pulses for each program run while the third counter 80 receives an input for each case of apparent vehicular redundancy (including step 49, AND gate 75 conductive with no passengers waiting, and AND gate 76 conductive when those waiting constitute less than $p$ percent of capacity). If the percentage of times a vehicle is considered redundant is greater than $w/z$ (i.e. if $w$ in counter 80 is reached before $z$ appears in counter 79), an instruction to take a vehicle out of service will be given at step 63 as the counters are cleared and the flip-flop 72 is reset; if $z$ is reached first, step 63 will not be activated as the cycle is restarted.

Figure 6:
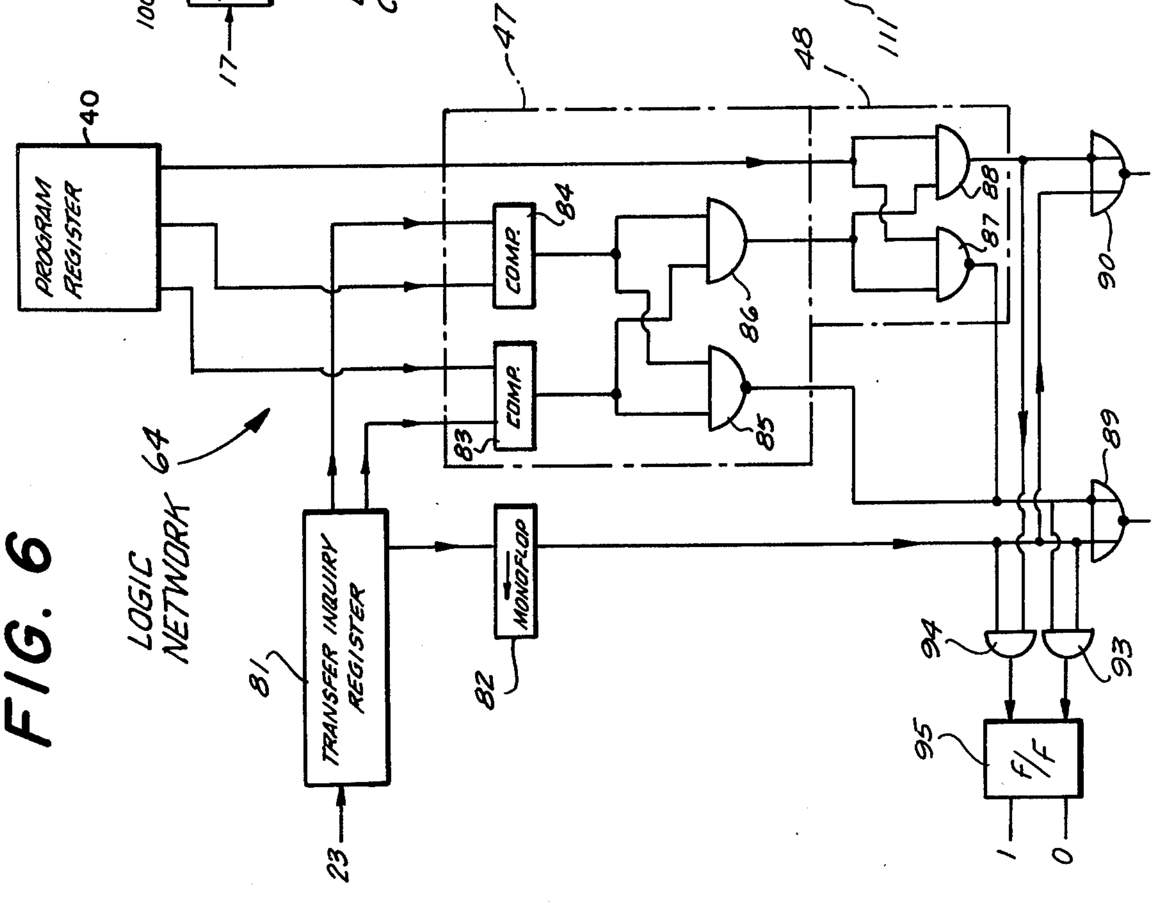
FIG. 6 is a diagrammatic representation of another logic network included in the central computer.

FIG. 6 is a diagrammatic representation of the logic circuit 64 which replies to transfer inquiries to the central computer 1 from passengers on the vehicles. Transceiver 23 of vehicle register 20 communicates the transfer inquiry, including the stop number and the direction desired, to the central computer 1 where it is received by a register 81 which sends a coded signal, similar to the bits of stages 44 and 45, to program step 47 ["Is there a vehicle at stop $H(P_{F+i})$ traveling in direction $R_F$?"] and also activates a monostable multivibrator or monoflop 82. This operation consists of evaluating first the location inquiry on the basis of the contents of stage 44 in a comparator 83 and then the direction inquiry on the basis of the contents of stage 45 in a comparator 84. The pair of responses are fed to the inputs of a NAND gate 85 and an AND gate 86 in parallel therewith, a "yes" answer causing an output from AND gate 86 (correlation in both comparisons) and a "no" answer causing an output from NAND gate 85. On "yes" the program proceeds to step 48 which, like step 47, comprises a NAND gate 87 and an AND gate 88 in parallel therewith. These gates have inputs energized by AND gate 86 on a "yes" response at step 47 and by input register 40. Depending on whether there is space in the vehicle, AND gate 88 or NAND gate 87 conducts to provide a "yes" or a "no" response. A "no" answer at step 48 joins the signal path of "no" at step 47, whereas a "yes" response would lead to restarting the program with F = F+1 at step 49; however, these responses must be cut off from the rest of the program 39, as a transfer inquiry does not constitute an actual program run-through. For this reason, NOR gates 89 and 90 have inverting inputs connected to the outputs of NAND gate 85 and AND gate 88, respectively, the other input of each NOR gate being connected to the output of monoflop 82. The signal from monoflop 82 in combination with either a "no" or a "yes" response to step 48 (taken before being inverted) unblocks an AND gate 93 or 94, respectively, both of which work into a flip-flop 95 to energize its "yes" output (1) or "no" output (0), respectively, sending the signal back to vehicle register 20 through transceiver 23.

Figure 7:
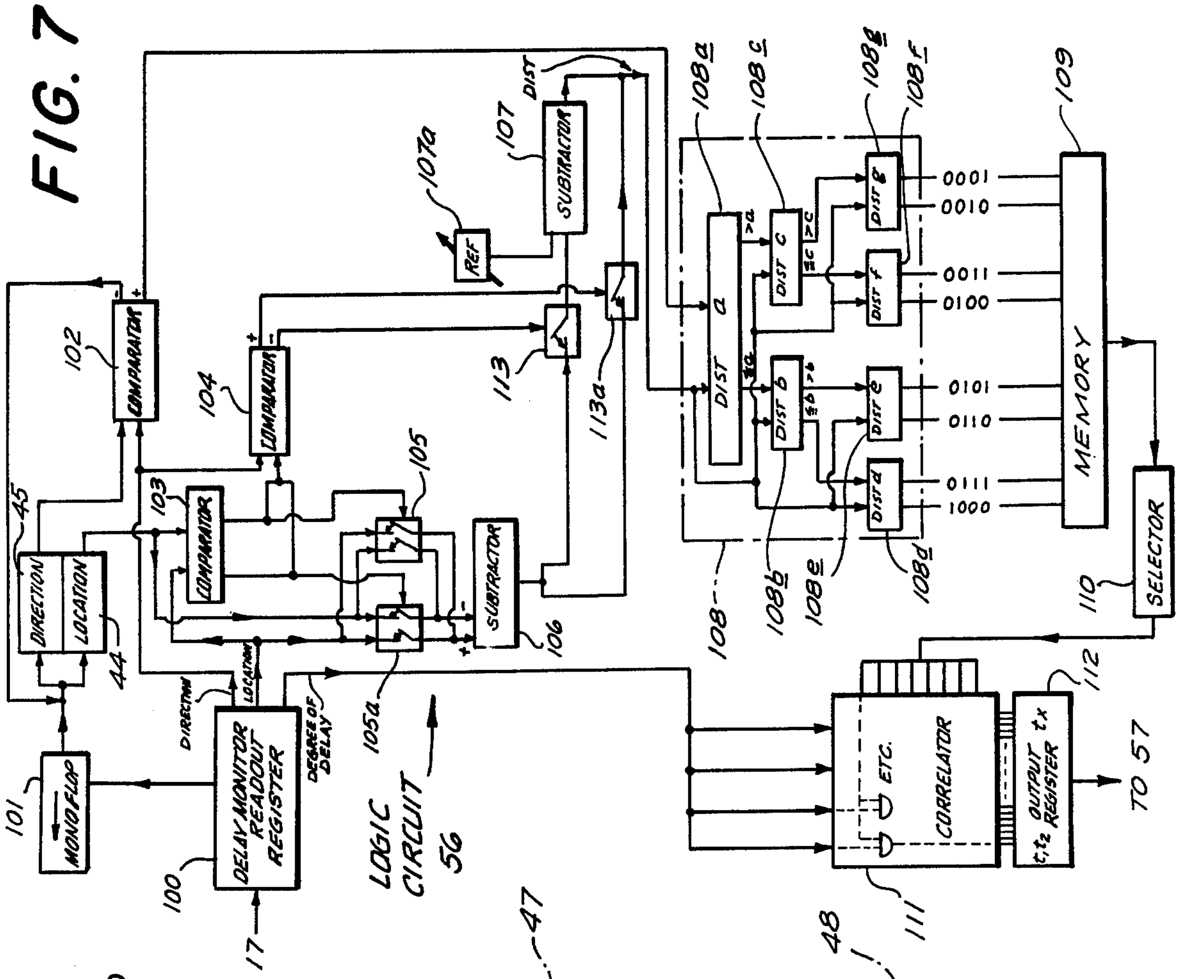
FIG. 7 is a block diagram illustrating a further logic network.

Logic network 56, which determines waiting time for the next-arriving vehicle 30, has been shown in FIG. 7 as comprising a delay register 100 fed by the traffic-density monitors 17, e.g. in the manner disclosed in U.S. Pat. No. 3,536,900, located at each stop. The activation of register 100 sets a monoflop 101 which checks the location and direction of all vehicles in service by calling forth the information stored in data stages 44 and 45, respectively. The direction desired by delay register 100 and that of the first vehicle inscribed in input register 40 are fed into a comparator 102. If they differ, the negative comparator output summons information about the next vehicle inscribed in register 40 and the process begins again. If the desired direction and the vehicle direction agree, the comparator output energizes one input of a multistage comparison network 108. The locations of the station and vehicle in question, pretranslated into binary codes indicating their distance from a predetermined, arbitrary point of origin along the basic route 42, are fed into respective inputs of a comparator 103 which gives a positive output if the numerical value of the stop code is greater than that of the vehicle code; otherwise, its output is negative. This output, of either polarity, reaches one input of a comparator 104 whose other input receives a code designating the direction desired at the stop in question as stored in register 100. An output from comparator 103 opens either of two gates 105 or 105*a* to enter the numerical value of the stop code or the vehicle code, whichever is larger, as the minuend and the other value as the subtrahend in a subtractor 106 which determines the distance between the stop and the vehicle by adding the binary complement of the subtrahend to the minuend, as is well known in the art. Comparator 104 concurrently determines if the calculated distance between these locations lies in the same direction as the vehicle is traveling, which is the case if its inputs agree as stated above. If they do not, as indicated by a negative output from comparator 104, the effective distance between stop and vehicle becomes the total route length less the calculated distance; thus, a negative output from comparator 104 opens a gate 113 leading to a subtractor 107, which calculates this new distance by adding the binary complement of the result obtained by subtractor 106 to the total route length *c* as stored in a source of reference voltage 107*a;* a positive output from comparator 104 opens a gate 113*a* to bypass the subtractor 107.

This calculated distance is supplied to the second input of the first stage 108*a* of comparison network 108 whose first input is energized by a positive output from comparator 102 consisting of a binary code *a*. If the calculated distance is less than or equal to the numerical value of code *a*, a zero output will result, energizing one input of a second-stage comparator 108*b* which consists of a binary code *b;* if the calculated distance is greater than *a*, one input of another second-stage comparator 108*c* will be energized in like manner. The calculated distance reaches the second inputs of all of the units of network 108. In a manner similar to that described, the positive and negative outputs of units 108*b* and 108*c* energize one input each of third-stage comparator units 108*d*, 108*e*, 108*f* and 108*g*, respectively. These four units have a total of eight outputs, ranging from the "0" output of unit 108*d*, which represents the smallest increment of distance as the result of three successive "less than or equal to" responses, to the "1" response of unit 108*g*, indicating the greatest distance increment by three "greater than" responses. The several distance increments may be represented by binary 1 through 8 for the eight possible outputs, i.e. 1000 (8) for the smallest increment through 0001 (1) for the largest. These results, in conjunction with a vehicle-identification code, are fed into a memory 109 wherefrom a selector 110 chooses the highest number after all vehicle codes have been entered. The selected distance increment is then fed to one input of an AND gate in a matrix of such gates forming part of a correlator 111, the delay determined by traffic-density monitor 17 and reported to register 100 being fed to the other gate input. The several AND gates of correlator 111 determine all possible combinations of distance increments and delays; based on statistics which can be periodically updated, the output of each AND gate representing a particular distance-increment/delay combination reads out a predetermined waiting time from an output register 112, this information being sent on to the next stage (step 57) of the program.

Let us assume, by way of example, that the vehicle I loading at station A has no passengers for stations B and C but is being boarded by a large number of passengers headed for stations D and H. A prospective rider is waiting at station C, intending to go to station E. Vehicle II, which at this instant is approaching station C, has five riders wishing to go to station E and one desiring to reach station F. The computer 1 thereupon determines that vehicles I should skip stations B and C and should proceed toward stations D-F-G-H, bypassing the out-of-the-way stop E, while vehicle II picks up the rider at station C. One of the passengers aboard vehicle I, ticketed for station E, then inquires about transfer possibilities at interchange D, dialing first the code of the central office 26 and thereafter successively the codes of stations D and E. He is then advised that vehicle II, now en route from station C to station D, will wait for him at station D to take him to his destination. The rider desiring to go to station F leaves vehicle II at station D and learns from the display indicator 12 thereof that the next vehicle headed his way will arrive shortly, this being vehicle I whose driver is now instructed by the computer to stop also at station F. In traveling toward his final stop H, the driver of vehicle I ignores a group of ticket holders at station G who want to go to station D and will be picked up by vehicle III moving in the opposite direction.

I claim:

1. An automatic dispatching system for a fleet of independently driver-operated vehicles serving a predetermined area with a multiplicity of potential stops for said vehicles at fixed locations, comprising:

centralized computer means;

station equipment at each of said locations linked by a telecommunication channel with said computer means, said equipment including a destination selector operable by prospective passengers; and information means aboard each vehicle in communication with said computer means, said information means including a register for the entry of stop identifications representing the destinations of passengers boarding the vehicle and station-indicating means for giving routing instructions to the driver of the vehicle, said computer means including logical circuitry and decision stages of a general-purpose computer programmed to evaluate data from the destination selectors at all said locations and from the registers aboard all said vehicles for operating said station-indicating means to route each vehicle to stops requiring service, while skipping stops not entered in the register thereof unless the destination selector at such stop is operated to report a prospective passenger, by the steps of (a) determining whether any passenger aboard a given vehicle has the next stop as a destination, (b) determining whether passengers are waiting at said next stop with destinations along the route traveled by said given vehicle, (c) determining, upon a positive determination in step (b), whether said next stop is being served by another vehicle traveling the same route and having available space for said waiting passengers, (d) upon a negative determination in step (a), and either a negative determination in step (b) or a positive determination in step (c), instructing the driver of said given vehicle to bypass said next stop.

2. A system as defined in claim 1 wherein said destination selector includes a ticket dispenser, said information means comprising a ticket reader connected to said register.

3. A system as defined in claim 1 wherein said station-indicating means is provided with driver-operated cancellation means.

4. A system as defined in claim 1, further comprising speed-sensing means aboard each vehicle communicating with said computer means, said equipment including display means controlled by said computer means in response to information from said speed sensing means to indicate the estimated arrival time of a vehicle headed for the respective stop.

5. A system as defined in claim 4, further comprising control means for traffic signals in the path of at least one vehicle, said computer means communicating with said control means for including the setting of said traffic signals in the calculation of said estimated arrival time.

6. A system as defined in claim 4, further comprising traffic-monitoring means along the path of said vehicles communicating with said computer means for the inclusion of traffic density in the calculation of said estimated arrival time.

7. A system as defined in claim 6 wherein said traffic-monitoring means comprises a vehicle counter at each of said locations.

8. A system as defined in claim 1 wherein said vehicles and said centralized computer means are provided with two-way communication means for handling inquiries from passengers.

9. A system as defined in claim 1 wherein said destination selector includes a panoramic map of the area served by said fleet and markings on said map representing the locations of said potential stops.

10. A system as defined in claim 9 wherein said markings are constituted by switches generating a selection signal for transmission to said computer means.

* * * * *